United States Patent Office 3,662,018
Patented May 9, 1972

1

3,662,018
PROCESS OF IMPROVING THE SELECTIVITY OF DEHYDROGENATION CATALYSTS
Levi C. Parker, Port Arthur, Tex., and Charles A. Senn III, Greenville, S.C., assignors to Texaco Inc., New York, N.Y.
No Drawing. Filed May 15, 1970, Ser. No. 37,913
Int. Cl. C07c 3/28
U.S. Cl. 260—683.3
8 Claims

ABSTRACT OF THE DISCLOSURE

This invention concerns a process for improving the selectivity of noble metal-containing zeolite catalysts in dehydrogenation reactions comprising preliminarily contacting the catalyst for at least 18 hours at temperatures between 675° F. and 775° F. and preferably at space velocities of from about 2 to 5.

BACKGROUND OF THE INVENTION

This invention concerns a novel pretreating process for improving the selectivity of noble metal-containig zeolite catalysts.

More particularly, this invention relates to a pretreatment given to noble metal-containing zeolite catalysts prior to their operational use in the dehydrogenation of alkanes to alkenes, to reduce the formation of undesired side products such as aromatics.

In two related patents, U.S. 3,458,592 and 3,458,593, methods are disclosed of converting n-paraffins to n-mono-olefins by contacting the n-paraffinic stock with a noble metal-containing alumino-silicate (commonly referred to as zeolite) molecular sieves having a uniform pore size of either 5 or 10 angstrom units. The reaction is conducted between about 80 0and 950° F. under a pressure between 0 and 220 p.s.i.g. contributed by hydrogen gas at a liquid space velocity up to 10.0 volume hydrocarbons/hour/volume of catalyst. The process is advantageous in that after a relatively brief break-in period of from 12 to 24 hours, yields of alkene are good and the amount of undesired contaminating isomerization products, cracked by-products and aromatics are substantially reduced compared to processes employing platinized and poisoned alumina catalysts of the prior art as typified by U.S. 3,293,-319. Unfortunately, even though aromatic contamination is substantially reduced, for some applications the amount of aromatics present is too high to be tolerated and the products containing these aromatics require a costly and time-consuming treatment to remove these contaminants. For example, in the preparation of lower alkenes to be used in fiber preparation, the presence of aromatics maternally affects the properties of the fiber. Similarly in the case of $C_{10}$ and higher alkenes for detergent synthesis, the presence of aromatics is undesirable. Finally, the production of aromatics poisons the catalyst and significantly shortens catalyst life.

Recently the applicants have discovered a novel pretreatment process that improves the selectivity of noble metal-containing zeolites, among other catalysts, both during the first 24 hours as well as subsequent operations. Not only is selectivity good but catalyst life is appreciably increased both prior to regeneration and after regeneration. While the initial degree of conversion to olefin is reduced,

2 in many applications this is of less importance than freedom from contamination.

Inasmuch as freedom from aromatics is an important consideration in the preparation of olefins, the novel process and the resultant pre-treated catalyst represent an advance in the art.

It is an object of this invention among others to provide a novel process for upgrading the selectivity of noble metal-containing zeolite dehydrogenation catalysts.

Another object is to provide a dehydrogenation catalyst having selective activity for extended periods of time.

Further objects will suggest themselves to those skilled in the art after a further reading of this application.

In practice, prior to operational use, an alkane charge is contacted for at least 18 hours with nobel metal-containing crystalline, zeolite molecular sieve catalysts, having a uniform pore size between about 3 and 15 angstrom units at temperatures between 675 and 775° F. under a pressure of between 0 and 220 p.s.i.g., utilizing a mole ratio of hydrogen to alkane charge of between from about 0.5:1 to 15:1, employing a liquid space velocity of between about 0.5 and 10 volumes alkanes/hour/volume catalyst. The olefin products produced by the novel pretreatment are recovered by the usual means of the art including selective extraction with solvents, azeotropic distillation, molecular sieve adsorption or chromatographic separation, among others. After this initial mild pretreatment the catalyst is utilized for efficient dehydrogenation, that is temperatures between about 800 and 950° F. The product effluent obtained under these mild conditions of pretreatment has a relatively low olefin content and relatively high aromatic cotent. This product can be used for applications where aromatics are tolerated or the product can be recycled for enrichment of the olefin content.

In the preferred practice platinized crystalline metallic alumino-silicate molecular sieves of uniform pore size of from about 3 to 10 angstrom units having platinum impregnated throughout them (from 0.1 to 5.0% by weight of platinum) are pretreated for about 18 to 48 hours with an alkane charge containing from 10 to 20 carbon atoms in at least one reaction zone maintained at temperatures between 700 and 750° F., under a pressure of between about 5 and 50 p.s.i.g., utilizing a mole ratio of hydrogen to alkane charge of between 2:1 to 9:1 and employing a liquid space velocity of between about 2 and 5 volumes of alkanes/hour/volume catalyst. Subsequently, the alkane charge is contacted with the pretreated catalyst at the more severe reaction conditions normally employed for the dehydrogenation of n-alkanes until regeneration is necessary.

In order to further aid in the understanding of the inventive concept, the following supplemental disclosure is submitted.

(A) Paraffinic hydrocarbon charge

The alkane or paraffinic charge which is dehydrogenated comprises hydrocarbons containing up to 30 carbon atoms or more. These paraffinic hydrocarbons can be in the form of single discrete compounds or can be in the form of mixtures. The favored charge comprises n-paraffins of 6 to 25 carbon atoms, preferably containing 10 to 20 carbon atoms. Illustrative n-paraffins comprise n-hexane, n-heptane, n-octane, n-nonane, n-decane, n-undecane, n-dodecane, n-tridecane, n-tetradecane, n-pentadecane, n-hexadecane, etc.

(B) Preparation of catalysts

The molecular sieve is impregnated with one or more Group VIII metal solutions (aqueous or organic) such as chloroplatinic acid, platinum diamine dinitrite, palladium chloride, etc., under agitation conditions sufficient to insure uniform impregnation of the catalyst, for a period of time ranging from several minutes to an hour or more. During this time the temperature is kept between about 50° F. and 300° F., preferably between about 100° F. and 200° F. The impregnated catalyst is then removed and dried, preferably between about 180° F. and 700° F. for a period of time ranging from about 3 to 30 hours and calcined at 900° F. for at least 4 hours.

(C) Pretreatment conditions (1) Temperatures.—As indicated earlier, the essence of this invention is the discovery that contacting alkanes with crystalline zeolite molecular sieve catalysts at temperatures substantially below the normally employed 800–950° F. temperatures results in a catalyst which has greater selectivity in subsequent dehydrogenation operations. The temperature required for pretreatment ranges from about 675° F., to about 775° F., preferably between about 700 and 750° F. It is desirable that the increase in temperature from the lower pretreatment temperature to the higher operational temperature be gradual, that is from 2 to 10° F., per hour, preferably from 5 to 7° F. per hour. Alternatively, the temperature could be held at 700° F., for several hours, then raised to 725° F., and held for several hours, etc. However, from an operating standpoint, it would be easier to maintain a gradual increase in temperature.

(2) Pressure.—The pretreatment reaction requires the application of positive pressure of a gaseous diluent preferably hydrogen gas. The operable range of pressure is from about 0 p.s.i.g. to about 220 p.s.i.g. with 5 to 50 p.s.i.g. being preferred when the catalyst is contacted with the alkane stock at the preferred temperature range of 700 to 750° F. As indicated above, the pressure is preferably maintained in the reaction zone by compressive hydrogen recycle which serves the dual purpose of supplying the positive pressure and controlling the extent of carbonaceous deposits on the catalyst. Generally the hydrogen flow is sufficient to maintain the mole ratio of hydrogen to paraffinic (or alkane) charge of 0.5:1 to 15:1, preferably between 2:1 to 9:1. A liquid hourly space velocity between 0.5 and 10 preferably between 2 and 5 volumes of hydrocarbons/hour/volume of catalyst is maintained during the pretreatment period.

(3) Crystalline zeolite catalyst.—These materials include a group of crystalline minerals having a continuous framework of linked tetrahedral groupings around silicon and aluminum atoms. The preferred catalysts are those referred to in the literature as molecular sieves. They can be of synthetic or natural origin, preferably synthetic, and for dehydrogenation purposes ordinarily contain at least one member of the class selected from Group VIII of the Periodic Table (such as platinum, palladium, ruthenium, etc.), as well as mixtures of these metals. These crystalline zeolites are further characterized by pore sizes of relatively uniform diameter, between about 3 and 15 A., preferably between 4 and 10 A. Suitable zeolites found in nature include mordenite, stilbite, heulandite, ferrierite, dachiardite, chabazite, erionite and faujasite. Suitable synthetic crystalline zeolites include those of the A, X, Y and L types. As indicated, the preferred zeolites are those having crystal pore size diameters between 4 and 10 A. whose $SiO_2/A_2O_3$ mole ratio is about 1.8–7. These zeolites among others are commercially available and can be prepared according to information contained in the literature as well as in the two related cases, patents U.S. 3,458,592 and 3,458,593.

As briefly described earlier, when the catalyst is utilized for dehydrogenation of alkanes (paraffins) it should contain at least one noble metal. The noble metals are selected from Group VIII of the Periodic Table, particularly platinum, palladium, rhodium or their mixtures, in amounts ranging from 0.1 to 5.0 weight percent, preferably between about 0.25 to 2 weight percent.

The dehydrogenation reaction can be conducted in one or more vapor phase reactors which can be packed with catalyst. For example, the invention may be applied to cyclic systems of the fixed bed type where several reaction zones are used in sequence for periods of time alternatively on reaction cycles and then on regeneration cycles. The invention may also be applied to moving bed processes in which a contact material is gravitated continuously through reaction and regeneration zones as a substantially compact mass of solids in an enclosed cyclic path or similarly to a continuous process in which the solids are passed through the reaction and reconditioning zones in a fluidized or gaseous suspension. In the preferred process two or more reactors of the fixed bed type would be utilized on stream while the remaining reactors are being regenerated. The following describes the dehydrogenation process employed.

In the laboratory, the n-paraffin charge to be dehydrogenated is pumped through a line into which hydrogen gas is introduced and the resultant mixture is introduced into a preheater section prior to entering the dehydrogenation reactor containing the catalyst. The reaction mixture is heated to the desired temperature during its passage through the preheater and then passed into the reactor containing the catalyst. The product is withdrawn from the reactor, cooled below its boiling point, and passed on to the stabilizer, the bottom section of which is maintained at about 250° F. to remove gases overhead. The stabilized liquid is recovered as n-paraffin, n-olefin product. The recovered materials are analyzed via liquid and gas chromatography.

As a result of this impregnation and heating, the noble metal impregnates the molecular sieve including the interior, probably at least to some extent in the form of an oxide.

To demonstrate the workings of this invention in the greatest possible detail the following illustrative examples are submitted. Unless otherwise noted, all percentages and parts are by weight rather than volume.

EXAMPLE I

Preparation of a dehydrogenation catalyst

A 50 parts by weight portion of a commercially available crystalline metallic alumina-silicate sieve having a pore opening size of about 10 angstrom units of a type designated as a 13× sieve whose synthesis is described in U.S. 2,822,244 and U.S. 3,311,190 whose empirical formula is believed to be:

$$0.83 \pm 0.05\ Na_2O:1.00Al_2O_3: 2.48 \pm 0.03 SiO_2 : 6.1 H_2O$$

was prepared by a double impregnation procedure in which the sieve was first contacted with 50 parts by weight of a solution of chloroplatinic acid which contained 2.0 weight percent of $H_2PtCl_6 \cdot 6H_2O$. The sieve and solution were mixed well at ambient temperature for about 30 minutes, then placed in an oven kept at about 150° F. for 2 hours. At the end of this time the platinized sieve was separated from the excess solution and dried for 16 hours at 200° F., then for 4 hours at 300° F. The excess chloroplatinic acid solution, after dilution with water to form a 26 parts by weight mixture with 74 parts by weight of the separated platinized sieve, was mixed with the platinized sieve for about 30 minutes at ambient temperature for the second impregnation. The twice impregnated platinized sieve was separated from the solution, dried at 200° F. for about 60 hours, 300° F. for 4 hours, 500° F. for 1 hour, 700° F. for 1 hour, and calcined for 4 hours at 900° F. After calcining, the platinized catalyst was cooled in a desiccator and stored. A representative sample upon analysis had a platinum content of 0.73 weight percent.

Table I which follows shows the effect that pretreatment has upon selectivity during the dehydration of a $C_{10}$ to $C_{14}$ mixture of n-paraffins, during the first 32 hours of operation.

TABLE I

Catalyst of Example 1 containing 0.73% by weight platinum—Charge A $C_{10}$ to $C_{14}$ mixture of n-paraffins

| Hours on stream | Temperature, °F.[1] | FIA analysis as vol. percent | |
|---|---|---|---|
| | | Olefins | Aromatics |
| 0-4 | 700-720 | 1.8 | 3.8 |
| 4-8 | 720-740 | 2.1 | 4.7 |
| 8-12 | 740-760 | 3.4 | 4.6 |
| 12-16 | 760-780 | 4.9 | 5.2 |
| 16-20 | 780-800 | 7.4 | 5.2 |
| 20-25 [2] | 800-825 | 9.6 | 3.9 |
| 25-28 | 825-840 | 13.4 | 3.9 |
| 28-32 | 840-860 | 15.6 | 3.5 |

[1] The remaining reaction conditions were as follows: 15 p.s.i.g., 2 LHSV and 3:1 hydrogen-to-hydrocarbon mole ratio.
[2] Selectivity for this period was 55.0 mole percent and conversion was 13.9 weight percent.

EXAMPLE II

Preparation of a pretreated dehydrogenatioin catalyst

This example illustrates the preparation of a pretreated platinized dehydrogenation catalyst derived from the platinized 13× molecular sieve of Example I. Operation in a $C_{10}$–$C_{14}$ charge is started at 700° F. reactor temperature and the temperature is increased at a rate of approximately 5° F. per hour until the normal operating temperature of about 850° F. is reached.

EXAMPLE III

Comparison of selectivity obtained with platinized molecular sieve catalysts of the prior art and the pretreated catalyst of Example II In this example, the catalyst of Example II which was pretreated for 32 hours is compared with substantially similar platinized molecular sieve catalysts designated B to F, which had not been pretreated. The temperature under which dehydrogenation was conducted in all instances was 860° F., the pressure employed was 15 p.si.g., the space velocity was 2 LHSV, and the hydrogen-to-hydrocarbon mole ratio was 8:1. The results obtained in the comparison runs are shown in Table II which follows:

In a related embodiment a palladium impregnated crystalline metalic alumino-silicate molecular sieve of the 13× type having a uniform pore size of 10 angstrom units demonstrated superior dehydrogenation selectivity compared to the same catalyst without pretreatment.

EXAMPLE IV

Preparation of pretreated dehydrogenation catalyst

Using the procedure described in Example II a platinized crystalline metalic alumino-silicate sieve having a uniform pore size of about 10 angstrom units having impregnated thereon about 0.73% by weight of platinum is pretreeated for 32 hours in a fixed bed reactor with a charge of $C_{10}$–$C_{14}$ n-paraffins. The temperature was kept between 700–720° F. for the first 4 hours of operation, 720–740° F. for the next 4 hours, and was raised in similar manner by approximately 5° F. per hour until a temperature of 860° F. was reached after 32 hours of operation. A pressure of 15 p.s.i.g., a liquid hourly space velocity of 2, and an 8:1 hydrogen-to-hydrocarbon mole ratio was employed throughout the pretreatment. After 32 hours of pretreatment the catalyst showed significantly better selectivity in the dehydrogenation of a $C_{10}$–$C_{14}$ mixture of n-paraffins compared to another portion of the same catalyst which was not subjected to the preconditioning procedure.

As indicated by the illustrative embodiments and examples, the novel process of this invention is advantageous compared to related processes of the prior art. For example, the pretreatment process produces improved selectivity in the products obtained by the dehydrogenation of n-paraffins and their mixtures to the corresponding olefins. In addition, on the average higher conversions are obtained using the conditioned catalyst obtained through the inventive process. Further advantages are the use of readily available crystalline metallic alumino-silicate molecular sieves, as well as conventional techniques and apparatus.

Finally, the novel process of this invention is advantageous in that reaction conditions and reactants, etc., may be varied or modified without departing from the inventive concept. For example, crystalline metallic alumino-silicate units may be employed for treatment and these

TABLE II

| Run No | A* | B | C | D | E | F |
|---|---|---|---|---|---|---|
| Catalyst | Platinum on 13-X molecular sieve | | | | | |
| Wt. percent platinum | 0.73 | 0.69 | 0.73 | 0.66 | 0.91 | 0.74 |
| Results— | | | | | | |
| Hours on stream at 860° F. | | | | | | |
| 0-4 | | | | | | |
| Conversion, wt percent | 21.3 | | | | | |
| Selectivity, mole percent | 77.8 | | | | | |
| 0-12 | | (4-16) | | | | |
| Conversion, wt percent | 19.9 | | 23.5 | | | |
| Selectivity, mole percent | 89.9 | | 59.2 | | | |
| 12-24 | | | | | | (23-24) |
| Conversion, wt percent | | 16.2 | | | | 15.8 |
| Selectivity, mole percent | | 78.1 | | | | 68.6 |
| 24-36 | | (28-40) | | | | |
| Conversion, wt percent | 15.8 | 13.3 | 16.2 | 12.4 | | |
| Selectivity, mole percent | 92.0 | 84.3 | 83.2 | 85.6 | | |
| 36-48 | | | | | (47-48) | |
| Conversion, wt percent | | 12.8 | 15.3 | | 16.4 | |
| Selectivity, mole percent | | 86.8 | 84.5 | | 79.8 | |
| 48-60 | | (52-64) | | | | |
| Conversion, wt percent | 14.6 | 11.5 | 15.4 | | | |
| Selectivity, mole percent | 89.9 | 88.5 | 86.5 | | | |
| 64-76 | | | | | | |
| Conversion, wt percent | 15.3 | | | | | |
| Selectivity, mole percent | 93.0 | | | | | |
| 112-124 | | | | | | |
| Conversion, wt percent | 12.6 | | | | | |
| Selectivity, mole percent | 94.4 | | | | | |

Remark: Nominal operating conditions were 860° F, 15 p.s.i.g., 2 LHSV and 8:1 hydrogen/hydrocarbon mole ratio.

Remark: Nominal operating-conditions were 800° F., 15 p.s.i.g., 2 LHSV and 8:1 hydrogen/hydrocarbon mole ratio.
*Note.—Temperatures during first 32 hours of Run A ranged from 700° F. to 860° F. All other runs in this tabulation started at 860° F.

As can be seen from the data in Table II, the selectivity of the catalyst was substantially improved by operation (pretreatment) at temperatures under 800° F. prior to operating at higher operating (standard) temperatures. In addition, conversions for the pretreated catalyst were better on the average.

sieves can contain one or more noble metals such as ruthenium, platinum, palladium or their mixtures. The metes and bounds of this invention may best be gleaned by an examination of the claims which follow in the light of the specification.

What is claimed is:

1. In the catalytic dehydrogenation of paraffinic charge stock to olefins, where noble metal impregnated crystalline metallic alumino-silicate molecular sieves of unitalline metallic alumino-silicate molecular sieves of uniform pore size varying from about 3 to 15 angstrom units and containing from 0.1 to 5.0% by weight of said noble metal is employed as dehydrogenation catalysts, at dehydrogenation temperatures of from about 800° F. and higher, under a pressure of between about 0 and 220 p.s.i.g,. the improvement comprising contacting said noble metal-impregnated molecular sieve with said paraffinic charge stock, prior to operational use, for a period of at least about 18 hours, at temperatures, ranging between about 675° to about 775° F., utilizing a mole ratio of hydrogen to alkane charge of between about 0.5:1 to 15:1, and utilizing a liquid space velocity of between about 0.5 to 10 volumes alkanes/hour/volume/catalyst.

2. The process of claim 1 wherein the pretreatment of said molecular sieves is carried out at temperatures ranging between about 700° F. to 750° F., at pressures ranging from 0 to 50 p.s.i.g., utilizing a mole ratio of hydrogen to paraffinic charge between 2:1 to 9:1, and a liquid space velocity of between 2 to 5 volumes of alkanes/hour/volume/catalyst.

3. The process of claim 2 wherein the pretreatment time ranges between about 18 and 48 hours.

4. The process of claim 2 wherein the noble metal is platinum.

5. The process of claim 2 wherein the noble metal is ruthenium.

6. The process of claim 2 wherein the noble metal is palladium.

7. The process of claim 1 wherein a mixture of noble metals is employed.

8. The process of claim 2 wherein the uniform pore size of the molecular sieve varies between 5° and 10° A.

References Cited

UNITED STATES PATENTS

| | | | |
|---|---|---|---|
| 3,433,851 | 3/1969 | Keblys | 260—683.3 |
| 3,424,671 | 1/1969 | Kay | 260—683.3 |
| 3,507,779 | 4/1970 | Baillie et al. | 208—119 |
| 3,458,592 | 7/1969 | Senn et al. | 252—455 Z |
| 3,458,593 | 7/1969 | Senn et al. | 260—683.3 |

DELBERT E. GANTZ, Primary Examiner

V. O'KEEFE, Assitant Examiner

PO-1050
(5/69)

UNITED STATES PATENT OFFICE
CERTIFICATE OF CORRECTION

Patent No. 3,662,018          Dated May 9, 1972

Inventor(s) Levi C. Parker; Charles A. Senn III

It is certified that error appears in the above-identified patent and that said Letters Patent are hereby corrected as shown below:

Col. 1, line 36     "80 0" should read --800--

Col. 1, lines 52 and 53     "maternally" should read --materially--

Col. 2, line 15     "18" should read --$\underline{18}$--

Col. 5, line 5 Table I     "A $C_{10}$ to $C_{14}$" should read --A $C_{\underline{10}}$ to $C_{\underline{14}}$--

Col. 5, line 15     "3:1" should read --8:1--

Col. 5, Table II     First line of figures "0 73, 0 69, 0 73, 0 66, 0 91, 0 74" should read -- 0.73 0.69 0.73 0.66 0.91 0.74

Col. 5, Table II under "A"     "21 3" should read --21.3--
"77 8" should read --77.8--

Col. 5, Table II     The "Remark" is printed twice

Col. 6, line 14     "$C_{10}-C_{14}$" should read --$C_{\underline{10}}-C_{\underline{14}}$--

Signed and sealed this 16th day of April 1974.

(SEAL)
Attest:

EDWARD M. FLETCHER, JR.          C. MARSHALL DANN
Attesting Officer                Commissioner of Patents